3,084,504
ROCKET ENGINE
Roy A. McKinnon, Cleveland, Ohio, assignor to Thompson Ramo Wooldridge Inc., Cleveland, Ohio, a corporation of Ohio
Filed May 26, 1959, Ser. No. 815,933
6 Claims. (Cl. 60—35.6)

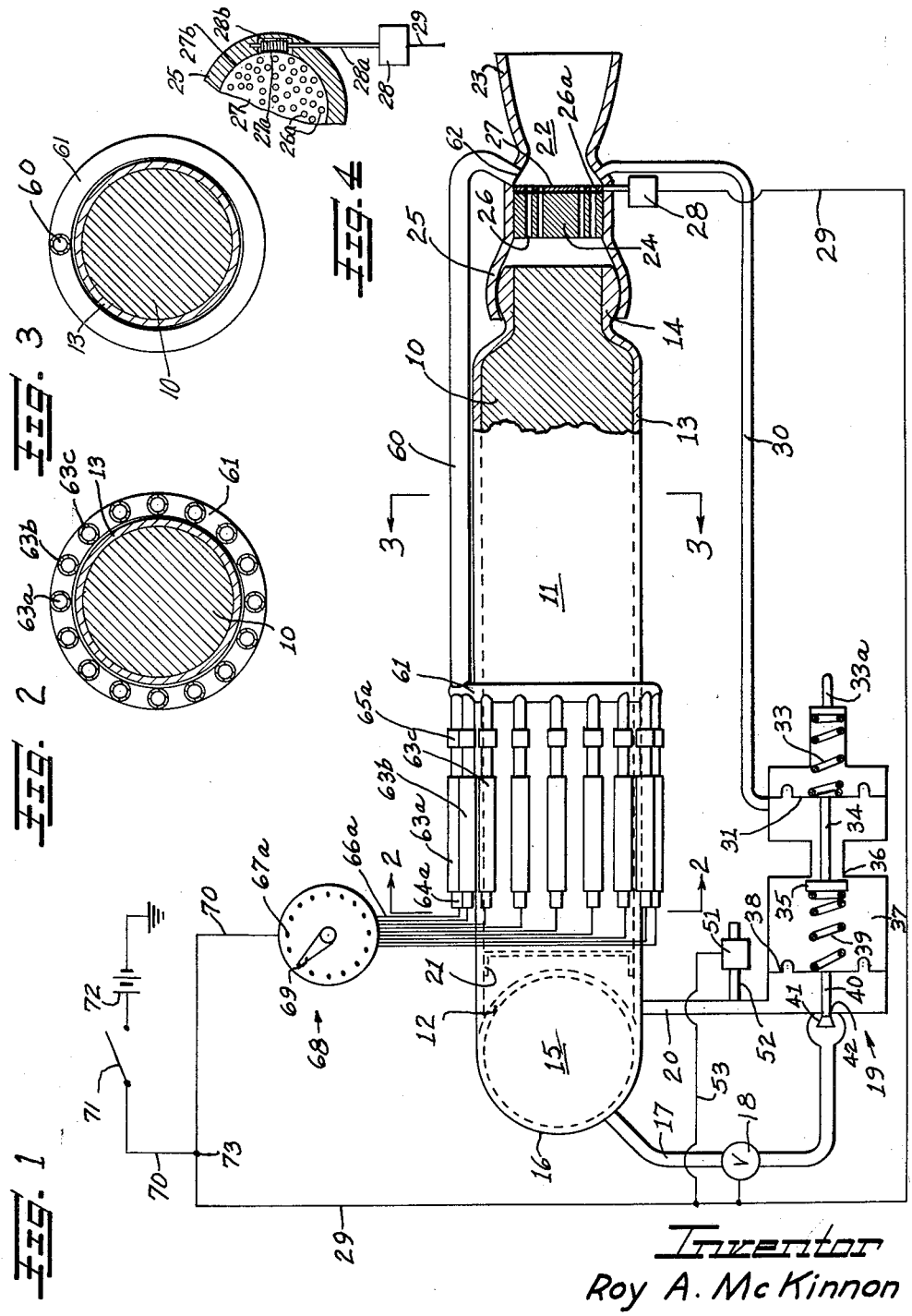

This invention relates to a rocket engine. More particularly, this invention relates to a rocket engine of the type adapted to burn an extrudable thixotropic monopropellant fuel in such a fashion that the rocket engine can be quickly and readily stopped by cutting off the extrusion of this fuel and can thereafter be readily restarted in flight without requiring further ground handling or reloading.

It is a feature of the present invention to provide a rocket engine having a fuel tank which may conveniently be of generally cylindrical shape and which is adapted to contain an extrudable monopropellant fuel which has flow and consistency characteristics such that it can be readily extruded through a plurality of burner tubes or other shaping means into a combustion chamber. The fuel may then be initially ignited in the chamber by hot gases generated from a squib or solid fueled rockets. A plurality of such igniting means are preferably disposed annularly about the fuel tank and may be switch selectably actuated to ignite or reignite the gelatinous fuel. When it is desired to stop the operation of the rocket engine, a cutoff plate member may conveniently accelerate such stopping.

It is thus an object of this invention to provide a rocket engine structure adapted to generate thrust from an extrudable monopropellant fuel and which may be readily stopped and reignited in use.

It is a further object of this invention to provide such a rocket engine in which a plurality of ignition means are switch selectably connected so that the engine may be repeatedly ignited.

It is a still further object of this invention to provide such a reignitable rocket engine in which a closure plate to stop the extrusion of the fuel and a vent to reduce extrusion actuating pressures quickly are provided in order to accelerate the cut-off of the engine.

Other objects, features and advantages of the present invention will be more fully apparent to those skilled in the art from the following detailed description taken in connection with the accompanying drawing therein:

FIGURE 1 is an elevational view partly diagrammatic and with portions broken away illustrating a rocket engine in accordance with the present invention.

FIGURE 2 is a sectional view taken along lines II—II of FIGURE 1.

FIGURE 3 is a sectional view taken along lines III—III of FIGURE 1.

FIGURE 4 is a fragmentary view in cross section of means for terminating extrusion found useful in the practice of the present invention.

The term monopropellant refers to a composition which is substantially self-sufficient with regard to its oxidant requirements as distinguished from bipropellants where the fuel is maintained separately from the oxidizer source until admixture at the point of combustion. Generation of gases for producing thrust as in a jet engine or prime mover of any type has hitherto generally been accomplished either by burning atomized sprays of mobile liquid mono- or bipropellant injected from a storage tank or tanks into the combustion chamber or by combustion of a solid propellant grain housed in the combustion chamber. Although each of these methods possesses desirable advantages relative to the other, each is also characterized by undesirable features. More recently there has been developed various plastic or gelatinous extrudable monopropellant fuels which combine many of the advantages and eliminates many of the disadvantages of the more commonly known liquid and solid fuels. The present invention is directed to a rocket engine structure adapted to burn such a gelatinous monopropellant to generate thrust. Although the engine structure is not restricted to use with any particular monopropellant, it is nonetheless true that the monopropellant used should possess certain requisite physical characteristics. It should be sufficiently cohesive to retain its shape for an appreciable length of time when extruded. Preferably also, its cohesive strength should be sufficiently high to withstand fragmentation under the given conditions in the combustion chamber. This is of importance not only for control of the desired burning surface area, but to avoid loss or wastage of unburned propellant by venting of the material out of the nozzle under such conditions as high acceleration. This is frequently a problem in the case of the burning of atomized mobile liquid propellants, some unburned particles of which fly out of the rocket nozzle. The degree of cohesive strength desirable is determined to some extent by the particular stresses developed in a particular use and the particular burning conditions as, for example, the unsupported length of the extruding, burning mass. Cohesive strength is closely related to the tensile strength of the material. In general, for the desired shape-retentivity, the monopropellant material should preferably have a minimum tensile strength of about 0.01 lb./sq. inch preferably about 0.03 p.s.i. or higher.

The cohesiveness or substantial tensile strength of the monopropellant maintains stability and uniform dispersion of its components as, for example, in the case of two-phase systems containing dispersed insoluble, solid oxidizer. This is of considerable importance, since it ensures uniformity of burning rate at the constantly generating burning surface as the end-burning material advances, thereby assuring a constant or controllable rate of gas generation.

The monopropellant, furthermore, should be extrudable at ambient temperatures, namely, should be capable of continuous flow, preferably under relatively moderate pressure differentials. Materials which are extrudable only at elevated temperatures or which require excessively high pressures to initiate and maintain flow present problems which make them generally unsuitable. In general, it is desirable to employ a material which flows at a maximum shear stress of about 10 p.s.i. at the wall of the tube or orifice through which it is being extruded.

The controllable feeding of a monopropellant having both shape-retentiveness and fluidity under stress substantially eliminates still another difficulty encountered with solid propellants housed in the combustion chamber, namely, the dangers of fracturing or cracking of the solid propellant which can so enormously increase burning surface area and the amount of gases produced as to cause explosion of the combustion chamber. The brittleness and fissuring characteristics of many solid propellants at low ambient temperatures is no problem with monopropellants having the physical characteristics requisite for my purpose since they can either be formulated so as to have exceedingly low freezing points or, upon warming to ambient temperatures of use, regain their flow characteristics and form a continuous, unbroken mass during pressure extrusion.

Substantially any monopropellant composition having the requisite physical characteristics, as for example, gelled liquid monopropellants such as hydrazine nitrate, nitromethane, or ethylene oxide containing a suitable gelling agent can be employed. One of the important advantages of the invention, however, stems from the fact that it makes possible the utilization of propellant compositions possessing the highly desirable characteristics of solid propellants in terms, for example, of the high density and high impulse required for high performance levels and reduced storage volume requirements with the important concomitant advantages of propellant feed control and, thereby, control of gas generation under varying circumstances.

Double-base propellant compositions comprising nitrocellulose gelatinized with nitroglycerine with or without, but preferably with, an inert, non-volatile plasticizer such as triacetin, diethyl phthalate, dibutyl phthalate or bibutyl sebacate, to reduce impact sensitivity, in proportions producing a soft gel having the requisite shape retentiveness and flow characteristics are suitable for use. Such relatively high-density, high-impulse propellants have hitherto been utilized only as solid propellants with the predesigning, presizing and other disadvantages entailed by this mode of use.

In general, gel compositions comprising about 3 to 25% nitrocellulose dissolved in nitroglycerine, desirably diluted with at least about 10%, preferably at least 20 to 30% by weight based on total liquid, of an inert plasticizer solvent to reduce sensitivity, possess the requisite physical properties. Such soft gel compositions also have the advantage of being admixable with finely divided insoluble solid oxidizer such as the ammonium, sodium and potassium perchlorates and nitrates, to provide for combustion of the inert plasticizer, while retaining the desired shape-retentive, extrudable characteristics. Other highly active propellant liquids, such as pentaerythritol trinitrate, 1,2,4-butanetriol trinitrate, and diethylene-glycol dinitrate, which normally are too sensitive for use as mobile liquid monopropellants, can also be gelatinized with nitrocellulose, with or without inert plasticizer diluent and with or without finely divided solid, insoluble oxidizer, to provide monopropellants of substantially higher density than presently usable mobile liquid monopropellants.

Still another advantage of the apparatus lies in the fact that it makes possible combustion with controllable feeding and gas generation rates of heterogeneous monopropellants which are characterized not only by high density and high impulse, but also by the high autoignition temperature, low shock-and impact-sensitivity, non-corrosiveness and non-toxicity of many of the presently used solid composite-type propellants, which make them safe to handle, to transport and to store for extended periods of time under substantially any environmental temperature conditions likely to be encountered. By heterogeneous is meant a two-phase system wherein a finely divided, solid oxidizer is dispersed in an organic liquid fuel in which the oxidizer is insoluble. Spraying or atomization into a combustion chamber or dispersions of a solid oxidizer in a liquid fuel, even where the solid is present in sufficiently small amounts so that the slurry is free-flowing, is not feasible. The solid tends to clog the small atomization orifices. Comminution of the composition into a finely divided spray in the combustion chamber also posed reaction problems because of the difficulty in maintaining the solid oxidizer phase and the liquid phase in properly proportioned contact for complete oxidation.

Heterogeneous monopropellant compositions which are particularly advantageous comprise stable dispersions of finely divided, insoluble solid oxidizer in a continuous matrix of a nonvolatile, substantially shock-insensitive liquid fuel, the composition having sufficiently high cohesive strength to form a plastic mass which maintains the solid oxidizer in stable, uniform dispersion and which, while capable of continuous flow at ambient temperatures under stress, nevertheless retains a formed shape for an appreciable length of time. The compositions, which preferably are soft gels, possess the characteristics of non-Newtonian liquids, namely yield to flow only under a finite stress.

The liquid fuel can be any oxidizable liquid which is preferably high boiling and substantially nonvolatile, which is preferably free-flowing or mobile at ordinary temperatures, and which is substantially inert or insensitive to shock or impact. The latter characteristic can be achieved by employing an oxidizable liquid, at least about 50% by weight of which is an inert compound requiring an external oxidizer for combustion. For special applications, an active liquid fuel containing combined oxygen available for combustion of other components of the molecule, such as nitroglycerin, diethylene glycol dinitrate, pentaerythritol trinitrate or 1,2,4-butanetriol trinitrate, can be admixed with the inert fuel component, such dilution serving substantially to nullify the sensitivity of the active component.

The inert liquid fuel is preferably an organic liquid which, in addition to carbon and hydrogen, can contain other elements such as oxygen, nitrogen, sulfur, phosphorus or silicon and which meets the aforedescribed requirements in terms of physical and chemical properties. Such liquid fuels include hydrocarbons, e.g., triethyl benzene, dodecane and the like; compounds containing some oxygen linked to a carbon atom, such as esters, e.g., dimethyl maleate, diethyl phthalate, dibutyl oxalate, dibutyl sebacate, dioctyl adipate, etc.; alcohols, e.g., benzyl alcohol, diethylene glycol, triethylene glycol, etc.; ethers, e.g.; methyl o-naphthyl ether; ketones, e.g., benzyl methyl ketone, phenyl o-tolyl ketone, osophorone; acids, e.g., 2-ethylhexoic acid, caproic acid, n-heptylic acid, etc., aldehydes, e.g., cinnamaldehyde; nitrogen-containing organic compounds such as amines, e.g., N-ethylphenylamine, tri-n-butylamine, diethyl aniline; e.g., caprinitrile; phosphorus-containing compounds, e.g., triethyl phosphate; sulfur-containing compounds, e.g., diethyl sulfate; pentamethyl disoloxyl-methyl methacrylate, viscous liquid polymers, such as polyisobutylene, and many others.

The solid oxidizer can be any suitable, active oxidizing agent which yields oxygen readily for combustion of the fuel and which is insoluble in the liquid fuel vehicle. Suitable oxidizers includes the inorganic oxidizing salts, such as ammonium, sodium, potassium and lithium perchlorate or nitrate, and metal peroxides such as barium peroxide. The solid oxidizer should be finely divided, preferably with a maximum particle size of about 300 to 600 microns, to ensure stable, uniform dispersion of the oxidizer despite lengthy storage periods, although some somewhat larger particles can be maintained in gelled compositions without separation.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10%, by weight. Beyond the requisite minimum any desired proportion of liquid fuel to dispersed solid can be employed, depending on the desired combustion properties, since the desired cohesive, shape, retentive properties can be obtained by additives such as gelling agents. Where the requisite cohesiveness and plasticity are obtained by proper size distribution of the finely divided solid, without an additional gelling agent, the amount of solid incorporated should be sufficient to provide the consistency essential for shape-retentiveness. This will vary with the particular liquid vehicle, the particular solid and its size distribution and can readily be determined by routine testing. The requisite physical properties of the plastic heterogeneous monopropellant can also be obtained without the use of a gelling agent by employing a viscous liquid vehicle, such as a relatively low molecular weight liquid polymer.

Thixotropic, plastic, shape-retentive compositions having the desired flow characteristics can be made by incorporating sufficient finely divided solid, insoluble oxidizer into the liquid fuel to make an extrudable mass when particles are so distributed that the minimum ratio of size of the largest to the smallest particles is about 2:1 and preferably about 10:1. At least 90% of the particles by weight should preferably have a maximum size of about 300 microns. Above this, a small proportion by weight up to about 600 microns can be tolerated.

It is sometimes desirable to incorporate a gelling agent in the solid oxidizer-liquid fuel dispersion. Such gels possess the desired dispersion stability, cohesiveness, shape-retentiveness and flow characteristics. Any gelling agent which forms a gel with the particular liquid fuel can be employed. Examples of compatible gelling agents include natural and synthetic polymers such as polyvinyl chloride; polyvinyl acetate; cellulose esters, e.g., cellulose acetate and cellulose acetate butyrate; cellulose ethers, e.g., ethyl cellulose and carboxymethyl cellulose; metal salts of higher fatty acids such as the Na, Mg, and Al stearates, palmitates and the like; salts of naphthenic acid; casein; karaya gum; gelatin; bentonite clays and amine-treated bentonite clays; etc. Organic gelling agents are preferred since they can also serve as fuels. The amount of gelling agent employed is largely determined by the particular liquid fuel, the particular gelling agent, the amount of dispersed solid, and the specific physical properties desired.

Particle size distribution of the dispersed solids is generally not an important factor in imparting cohesive, plastic properties to the composition and in minimizing separation where a gelling agent is employed since these factors are adequately provided for by the gel. Even some substantially large solid particles as, for example, up to about 1000 microns, can be held in stable dispersion. However, the presence of different size particles is often desirable because of the improved packing effect obtained, in terms of increased amounts of solids which can be incorporated.

Finely divided, solid metal powders, such as Al, Mg, Zr, B, Be, Ti, Si, or the like, can be incorporated in the monopropellant compositions as an additional fuel component along with the liquid fuel. Such metal powders possess the advantages both of increasing density and improving specific impulse of the monopropellant because of their high heats of combustion. The metal particles should preferably be within a size range of 0.25 to 50 microns. The amount of such metal fuel added is not critical but is determined largely by the specific use and the requisite physical characteristics of the composition as aforedescribed. For example, it should not be incorporated in such large amounts that the mixture either becomes granular in texture or deficient in amount of oxidizer. In general, the maximum amount of metal powder which can be introduced while maintaining the desired physical properties of the composition and an adequate amount of solid oxidizer is about 45% by weight, and depends upon the density of the metal and its chemical valence or oxidant requirement for combustion.

The amount of oxidizer can be less than stoichiometric so long as sufficient is introduced to maintain active combustion and a desired level of gas generation. The presence of an active liquid fuel component, namely a fuel containing oxygen available for combustion, reduces, of course, the amount of solid oxidizer required.

A gelatinous monopropellant fuel having the foregoing characteristics is indicated generally by the reference character 10 in the drawing. The fuel 10 is stored in a generally cylindrical fuel tank 11 having a front wall 12, a longitudinally extending side wall 13, and a rearward reduced exit portion 14. The front wall 12 of the fuel chamber 11 also forms a portion of a spherical tank 15 having a forward wall 16 which also forms a forward wall of the rocket engine. The forward wall 16 is of course rigidly or integrally formed with the side wall 13 of the fuel tank 11. The tank 15 is adapted to contain an inert gas such as nitrogen under pressure which gas may be fed through a pipe or conduit 17 controlled by a solenoid actuated valve 18 through a pressure control unit 19 into a pipe or conduit 20 communicating with the interior of the fuel tank 11 just in back of the forward wall 12 thereof.

Slidably mounted within the fuel tank 11 is a piston 21 which is adapted to be actuated by the gas supplied under pressure from tank 15 through conduits 17 and 20 to extrude the fuel 10 from the rearward reduced portion 14 of the fuel tank 11.

A combustion chamber 22 and thrust generating nozzle 23 are mounted in back of the fuel tank 11 positioned to receive fuel extruded therefrom through an extrusion member 24. The combustion chamber 22 and nozzle 23 may be integrally formed and may conveniently be mounted on the reduced rearward portion 14 of fuel tank 11 by gimbal mounting means 25. Since this mounting means does not form a part of the present invention it is indicated only schematically and it will specifically be understood that the member 25 could alternatively be rigidly attached to the rearward portion 14 of fuel tank 11.

The extrusion member 24 is provided with a plurality of orifices or apertures 26 which extend longitudinally thereof and through which the fuel is extruded in a shaped column or strip. Mounted concentrically with and rotatably with respect to the extrusion member 24 is a solenoid actuated cut-off plate 27 of a type which does not form per se a part of the present invention. The cut-off plate 27 is provided with a plurality of apertures 26a which in the position shown in the drawing made with the extrusion apertures 26 so as to form a continuation thereof through which fuel may normally be extruded. A solenoid actuator 28 is provided to mechanically rotate the cut-off plate 27 so that the apertures 26a therein are no longer in alignment with the apertures 26 in member 24 and to thereby cut-off or prevent further extrusion of the fuel 10. The mechanism for actuating the cut-off plate may include an arm 28a operably responsive to solenoid 28 and movable in the directions indicated by the arrow. Fixed to the end of the arm 28a opposite the solenoid is a worm gear 28b in mesh with gear teeth 27a formed in an arcuate portion of the side wall 27b of the flow splitter plate 27. Thus, movement of the arm 28a in either direction indicated by the arrow causes rotation of the cut-off plate 27 to position the apertures 26a and 26 in or out of registry. The solenoid actuator 28 may be activated by an electrical signal applied over a control line 29 forming part of an electrical circuit the operation of which will be discussed in greater detail below.

A conduit or pipe 30 is connected from combustion chamber 22 to the pressure control unit 19 so as to apply combustion chamber pressure to one side of a diaphragm member 31 in control unit 19.

The thrust produced by the rocket engine is a function of the combustion chamber pressure which is in turn a function of the burning rate of the fuel which in turn is a function of the rate at which the fuel is extruded to the combustion chamber. In order to maintain the rocket thrust at a preselected desired value the combustion chamber pressure is therefore applied to conduit 30 to one side of the diaphragm 31 in the control or thrust regulating unit 19. An adjustable calibrated spring 33 urges the diaphragm 31 to the left as seen in FIGURE 1 whereas the combustion chamber gas pressure is applied through line 30 to the diaphragm 31 to urge it to the right as seen in FIGURE 1. Mounted on the diaphragm 31 is a valve stem 34 and a valve 35 which may seat on a valve seat 36 at the inlet to a primary chamber 37 of the thrust regulator 19. A second diaphragm member 38 is positioned to divide the chamber 37 into two portions. A spring 39 is connected between valve 36 and one side of the diaphragm 38. A valve stem 40 carrying a valve 41 is connected to the other side of the diaphragm 38. Valve 41 is positioned to cooperate with a valve seat 42 at the inlet to chamber 37 from the nitrogen line 17 at the point where it enters the thrust regulator 19.

In operation, the adjustable calibrated spring 33 is set for a desired value of thrust as by adjustment of the position of a plunger 33a bearing against the spring 33. This loads the spring 33, diaphragm 32, valve stem 34, spring 39, and diaphragm 38, and valve stem 40 to open the nitrogen valve 41 so as to admit nitrogen under pressure through line 20 to actuate the drive piston 21 thereby causing the extrusion of fuel 10 into the combustion chamber 22. This fuel is ignited by hot gases discharged from a conduit 60 in a manner to be described in detail below. Burning of the fuel in the combustion chamber builds up pressure therein which is communicated through line 30 to act on the diaphragm 31 and urge it toward the right in FIGURE 1 thereby tending to urge the valve 41 toward its closed position to reduce the pressure of the nitrogen being supplied through line 22 and thereby reduce the rate of fuel extrusion. When the desired value of rocket thrust has been achieved, as indicated by the desired value of combustion chamber pressure, the pressure acting on the left side of the plunger 31 is equal to the pressure applied to the right side of the diaphragm by spring 33 and the diaphragm 31 is in equilibrium. In this equilibrium position, the valve 41 is positioned to maintain a nitrogen pressure sufficient to produce a rate of fuel extrusion which will just maintain the desired thrust. However, it will be apparent that the pressure in the nitrogen fuel tank itself falls as more and more nitrogen is used during the course of the rockets travel. By way of example, the initial pressure of the nitrogen may be 2000 p.s.i. and the final pressure at the end of the expulsion may be as low as 400 p.s.i. Such pressures may be used, for example, where it is desired to maintain a combustion chamber pressure in the neighborhood of 300 p.s.i. It is apparent that as long as fuel extrusion is desired to continue, the nitrogen pressure must be greater than the combustion chamber pressure in order to overcome the back pressure from the combustion chamber on the fuel.

It will, of course, be understood that the thrust regulator calibrated spring may either be permanently adjusted by manual means before firing the rocket in order to maintain a fixed predetermined value of thrust, or that any suitable remotely controlled actuating means may be provided to actuate the plunger 33a so as to vary the adjustment of the spring 33 to produce a program of variation of thrust during the flight of the rocket. In practice, if it is desired to start the operation of the rocket it would in fact be sufficient to simply reduce the setting so that the combustion chamber pressure is less than the minimum value of combustion chamber pressure necessary to support combustion of the fuel. In order to provide a faster and more positive thrust termination, however, the solenoid actuated plate 27 may be provided.

In order to facilitate the operation of the cut-off plate, a solenoid valve 51 in a vent line 52 may be connected by an electric wire 53 in a control circuit to be described below so that when cut-off is called for the solenoid valve 51 is opened to vent the nitrogen pressure to atmosphere thereby venting the entire nitrogen content which has been built up in the fuel tank 11. Of course, it will be understood that the control unit 19 is so programmed that the valve 41 is closed simultaneously before the opening of solenoid 51 so that nitrogen is not lost from tank 15.

Also, if desired, the combustion chamber pressure may be vented suddenly to atmosphere in accordance with techniques well known in rockets using solid propellants. If this technique is used it is necessary to provide open area in the combustion chamber vent at least five times greater than the nozzle throat area. Inasmuch as this technique is one that is conventional in the art, it is not illustrated in detail herein.

As noted above, when the fuel 10 is first extruded into the combustion chamber 22 it is ignited by hot gases supplied through a conduit 60 which leads from an annular manifold 61 to a port 62 in the wall of the combustion chamber 22. Connected to discharge hot gases through manifold 61 and conduit 60 are a plurality of squibs or solid fueled rockets of the type which are conventional in the art for ignition purposes. These starting squibs are indicated in outline in the drawing at 63a, 63b, 63c, etc. In the drawing 16 of such ignition squibs are shown by way of example each squib being mounted on the outer surface of the fuel tank 11 coaxially therewith and the plurality of squibs being arranged in spaced relationship annularly around the periphery of the fuel tank. Each of the squibs is provided with an electrical starting means such as a heating unit indicated by way of example at 64a in the drawing and with a check valve such as the check valve 65a which permits gases to be discharged only from the squib to the manifold and not in reverse direction. The electrical heating unit associated with each squib is adapted to ignite a primary charge in the squib which in turn ignites the solid fuel charge contained in the small rocket. This solid fuel discharges hot gases through the associated check valve into the manifold through conduit 60 and thence into the combustion chamber where these hot gases ignite the gelatinous monopropellant being extruded from the fuel tank.

Each of the electrical heating units 64 connected with the squib rocket 63 is connected through a wire or lead such as the lead 66a to a terminal such as the terminal 67a of a rotary setting switch 68 having a switch arm 69. A wire or electrical lead 70 is connected from the switch arm 69 to an on-off switch arm 71, the other terminal of which is connected to one terminal of a battery 72 having its other side grounded. The electrical control line or wire 29 from solenoid operator 28 is connected to the wire 70 at the junction point 73 thereby placing the elements connected to wire 29 in parallel with the switch arm 69. Of course it will be understood that the other terminals of each of the circuit elements such as the heating units 64a, the solenoid operated vent valve 51, the solenoid operated on-off valve 18, and the cut-off plate solenoid actuator 28 are also connected to ground so that closing of the switch 71 simultaneously applies power to each of these circuit elements.

In operation, when switch 71 is closed either manually or by remote control means, electrical energy is supplied from battery 72 through switch 71 over wire 70 to the switch arm 69 of rotary stepping switch 68. Switch arm 69 will either be in its initially determined position or in the position in which it has been left after the previous cycle of operation. In either event, electrical energy will be supplied from switch arm 69 through one of the terminals 67 and over one of the wires 66 to one of the heating elements 64 of one of the squibs or ignition rockets 63. For example, if the switch arm 69 were positioned on the terminal 67a then the heating element 64a would be energized which would in turn fire the squib or ignition rocket 63a which would discharge hot gases generated by the combustion of the solid fuel through the check valve 65a into manifold 61 and thence through conduit 60 into the combustion chamber 22. It will of course be understood that a sufficient charge is provided in each of the ignition rockets so that it will burn for a sufficient length of time to permit the initial extrusion and ignition of the gelatinous monopropellant fuel 10.

Simultaneously with the firing of one of the squib rockets the closing of switch 71 also supplies electrical energy over wire 70, wire 29, and wire 53 to vent valve 51. Valve 51 is spring or otherwise biased to a normally open position and electrical energization of the valve is adapted to hold it in a closed position so that it remains closed as long as switch 71 is closed.

Also connected in parallel as noted above and hence simultaneously energized is the on-off solenoid valve 18. This valve is normally biased to a closed position and is opened by electrical energization of its coil when the switch 71 is closed. Opening of valve 18 and closing of valve 51 permits nitrogen to flow from pressurized tank 15 into the fuel tank to activate the piston 21.

The cut-off plate 28 is similarly biased by spring or other mechanical means to a position in which the apertures in the cut-off plate are out of alignment with the apertures in the extrusion member so that it is impossible for fuel to be extruded through the combination of extrusion member and cut-off plate. The application of electrical energy to the actuator 28 when switch 71 is closed rotates the cut-off plate to the open position in which the apertures in the cut-off plate are aligned with the apertures or orifices in the extrusion member so that fuel may be extruded by motion of piston 21 in fuel tank 11 forcing the flowable thixotropic gelatinous fuel 10 through the extrusion member. When the fuel is forced out of the extrusion member it is ignited by hot gases supplied through conduit 60 to the combustion chamber 22.

As noted above, the amount of thrust generated may be controlled by the setting of the biasing member in the controlled unit 19. If, however, it is desired to entirely stop the operation of the rocket engine, the switch 71 may be opened. Opening of switch 71 may conveniently be used to trigger any suitable electrical or mechanical means for stepping the switch arm 69 of switch 68 around one position to place it in the proper position to actuate the next squib to be fired during the next cycle of operation. This stepping mechanism may, for example, be a spring actuated device which is prevented from functioning when switch 71 is closed by a holding relay or other conventional circuit.

Opening of the switch 71 in addition to stepping the switch arm 69 around one position also serves to close the solenoid controlled valve 18 and to open the solenoid controlled vent valve 51. This action permits the nitrogen previously admitted to the fuel tank 11 to escape to ambient atmosphere and removes the pressure formerly applied to the extruding piston 21.

Simultaneously, with the actuation of the stepping switch and the actuation of the valves 18 and 51 as discussed above, the cut-off plate actuating member 28 is also deactivated by opening of switch 71 and the cut-off plate member is rotated back to its closed position. The combined functioning of the cut-off plate member and the venting of extrusion pressure assures a positive fast thrust cut-off to the rocket engine.

It will be apparent to those skilled in the art that when it is desired to again restart the rocket engine it is only necessary to reclose the switch 71 to thereby repeat the cycle of operation discussed above.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A gelatinous monopropellant fueled rocket engine comprising, a combustion chamber and an exhaust nozzle, a generally cylindrical fuel tank adapted to contain gelatinous monopropellant fuel, means to extrude said fuel from said tank into said combustion chamber, a plurality of separate igniting squibs for said rocket engine, said squibs being mounted around the periphery of said fuel tank, each of said squibs being connected to discharge hot gases into a common manifold through a check valve when said squib is ignited, means to conduct said hot gases from said manifold to said combustion chamber to ignite said monopropellant fuel in said combustion chamber, a solenoid actuated rotary cut-off plate member movably mounted to selectively prevent the extrusion of said fuel and stop said engine, and stepping switch means operatively connected in a circuit to successively actuate said igniting squibs to restart said engine after each stopping of said engine by the solenoid actuated rotary cut-off plate member.

2. In a gelatinous monopropellant fueled rocket engine, a fuel tank adapted to contain gelatinous monopropellant fuel, a combustion chamber and a discharge nozzle positioned to respectively receive fuel from said tank and to discharge gases generated by the combustion of said fuel, inert gas pressure actuated means to extrude said fuel from said tank to said combustion chamber, a plurality of switch selectable igniting means, each of said igniting means being operatively connected to ignite said gelatinous fuel extruded to said combustion chamber when said igniting means is actuated, a source of electrical energy connected in a control circuit comprising four branches connected in parallel across said source of energy, a first of said branches comprising said switch selectable actuators for said igniting means, a second of said branches comprising an actuator of a regulating valve controlling the flow of said inert gas to said fuel tank, a third of said branches comprising an actuator of a normally closed valve for venting said gases in said fuel tank to ambient atmosphere, and a fourth of said branches comprising an actuator for said fuel cut-off means.

3. A gelatinous monopropellant fueled rocket engine comprising, a generally cylindrical fuel tank adapted to contain gelatinous monopropellant fuel, a combustion chamber and exhaust nozzle, pressurized gas means to extrude said fuel from said tank into said combustion chamber, a plurality of separate gas generating igniting means for said rocket engine, said igniting means being mounted around the periphery of said fuel tank, a common manifold around the periphery of said fuel tank, each of said igniting means being connected to discharge hot gases into said common manifold through a check valve when said igniting means is actuated, means to conduct said hot gases from said manifold to said combustion chamber to ignite said monopropellant fuel in said combustion chamber, means to stop the operation of said engine by preventing the extrusion of said fuel to said combustion chamber and simultaneously venting said pressurized gas applied to said extrusion means, and stepping switch means operatively connected in a circuit to actuate one of said igniting means to restart said engine.

4. A gelatinous monopropellant fueled rocket engine comprising, a combustion chamber and an exhaust nozzle, a fuel tank adapted to contain gelatinous monopropellant fuel, gas pressure actuated means to extrude said fuel from said tank into said combustion chamber, a source of inert gas connected to supply gas to said fuel tank to actuate said extrusion means, first valve means positioned to control the flow of said gas to said fuel tank, means to prevent the extrusion of said fuel from said fuel tank to stop said engine, second valve means positioned to vent the gas previously admitted to said fuel tank and connected to be actuated to vent said gas to relieve the pressure on said extrusion means when said engine is stopped, a plurality of separate igniting means connected to supply hot gases to said combustion chamber to ignite said gelatinous monopropellant fuel extruded thereto, and switch selectable means to actuate one of said igniting means whereby said rocket engine may be ignited, stopped and reignited in flight without reloading.

5. A gelatinous monopropellant fueled rocket comprising,
   a combustion chamber and an exhaust nozzle,
   a fuel tank adapted to contain gelatinous monopropellant fuel,
   means to extrude said fuel from said tank into said combustion chamber, gas generating igniting means for said rocket engine, means for communicating gas generated by said gas generating igniting means to said combustion chamber to start the operation of said rocket engine, means for selectively actuating said gas generating igniting means, and means for selectively stopping the operation of said engine including an extrusion plate having an opening therein and mounted in operative relation to the fuel tank, and a solenoid actuated cut-off plate having an opening selectively registering with the opening in the extrusion member to afford extrusion of fuel from the fuel tank to the combustion chamber in response to actuation of the means to extrude fuel from the tank to the combustion chamber, said cut-off plate being mounted to be rotated by said solenoid actuator selectively to move the opening in the cut-off plate out of register with the opening in the extrusion member and thereby to cut off further extrusion of the fuel from the fuel tank into the combustion chamber.

6. A rocket engine according to claim 5 wherein the gas generating igniting means includes, a plurality of separate igniting squibs mounted around the periphery of the fuel tank, a manifold mounted around the periphery of the fuel tank in communication with the squibs and wherein said means for selectively actuating said igniting means includes a stepping switch for successive energization of the individual squibs to restart the engine after closing off fuel flow from the fuel tank to the combustion chamber in response to movement of the cut-off plate to a position wherein the opening therein is out of register with the opening in the extrusion member.

References Cited in the file of this patent

UNITED STATES PATENTS

| | | |
|---|---|---|
| 1,550,007 | Ciraolo | Aug. 18, 1925 |
| 2,742,759 | Flanigen et al. | Apr. 24, 1956 |
| 2,814,929 | Morley et al. | Dec. 3, 1957 |
| 2,906,091 | Kretschmer | Sept. 29, 1959 |
| 2,931,175 | Jamison et al. | Apr. 5, 1960 |
| 2,943,673 | Hickman | July 5, 1960 |
| 2,945,344 | Hutchinson | July 19, 1960 |
| 2,971,097 | Corbett | Feb. 7, 1961 |
| 2,988,879 | Wise | June 20, 1961 |

FOREIGN PATENTS

| | | |
|---|---|---|
| 582,621 | Great Britain | Nov. 22, 1946 |
| 627,722 | Great Britain | Aug. 15, 1949 |